Nov. 11, 1958 H. N. BEVERIDGE ET AL 2,859,962

CAPSTAN FOR ELECTROSTATIC TAPE DRIVES

Filed April 15, 1955

INVENTORS
HAROLD N. BEVERIDGE
RAYMOND P. MORK

BY Elmer J. Gorn
ATTORNEY

United States Patent Office 2,859,962
Patented Nov. 11, 1958

2,859,962

CAPSTAN FOR ELECTROSTATIC TAPE DRIVES

Harold N. Beveridge, Kenilworth, Ill., and Raymond P. Mork, Needham Heights, Mass., assignors, by mesne assignments, to Minneapolis-Honeywell Regulator Company, a corporation of Delaware Application April 15, 1955, Serial No. 501,603

7 Claims. (Cl. 271—2.3)

This invention relates to a capstan for an electrostatic tape drive, and more particularly, to the use of a high K ceramic material for said capstan. A suitable tape drive mechanism has been fully disclosed in a copending application entitled, "Electrostatic Tape Drive," by Harold N. Beveridge, filed April 15, 1955, Serial No. 501,605.

In this invention there is disclosed a capstan arranged to control the movement of a tape, said capstan comprising a conductive member bonded to a high K material, said tape comprising a magnetic tape having a conductive material bonded on one side, and means for causing said capstan and said tape frictionally to engage each other by the application of electrostatic forces. An improved tape suitable for use with an electrostatic tape drive mechanism has been fully disclosed in a copending application entitled, "Electrostatic Tape and Method of Construction," by Albert J. Devaud, filed April 25, 1955, Serial No. 503,752. The electrostatic forces referred to previously are generated between the capstan and the conductive member located in the tape. A capstan constructed in accordance with the principles of this invention consists of a high K ceramic material, preferably one having a dielectric constant of 1,000 or more bonded to a conductive member, said ceramic material placed in such a position as to be capable of making contact with said tape.

The electrostatic clutch acts on the principle of the attraction of two plates of an electrically charged condenser. In the electrostatic clutch the capstan acts as one plate and the electrical conductive member in the tape as the other plate. It can be seen, therefore, that since the tape acts as one plate of an electrostatic clutch, that all moving masses and magnetic fields always needed in previous clutching mechanisms are eliminated, since the tape is acted upon directly.

In previous electrostatic clutch designs, the capstan involved the use of a thin dielectric insulating layer bonded on a metal pulley. Due to difficulties in construction it was found practically impossible to obtain a uniform thin insulating layer free from pinholes. It was found when voltages were applied to the system that arcs developed through these pinholes reducing the effective voltage so markedly that the operation ceased to be practical. In this invention, a high K ceramic material having a dielectric constant of a thousand or more is used in place of the insulating material previously referred to. Due to the high dielectric constants of the high K ceramic material, it has been possible to bond a dielectric layer having a thickness of approximately only one or two-tenths of an inch to a metal pulley. Since high K ceramic materials one or two-tenths of an inch thick are capable of withstanding voltages in the order of kilovolts, it is now possible to develop extremely strong electrostatic fields without the possibility of destructive arcs developing.

The application of a signal voltage to the conductive member of the rotating capstan constructed in accordance with the principles of this invention will immediately cause an electrostatic force to appear between the conductive portion of said tape, previously referred to, and the conductive portion of said capstan, thereby immediately attracting said tape to said capstan. The improved acceleration time achieved by this system of applying electrostatic forces between a capstan and a tape is duplicated in the deceleration time of said tape by simply applying a voltage between a stationary portion of the capstan and said conductive member on said tape. It will be noted that for deceleration the electrostatic forces are applied between the conductive member on said tape and the stationary portion of said capstan, as opposed to acceleration, which is achieved by applying electrostatic forces between said conductive member of said tape and the movable portion of said capstan.

Further objects and advantages of this invention will be apparent as the description progresses, reference being made to the accompanying drawings wherein.

Figures 1, 2, 5:
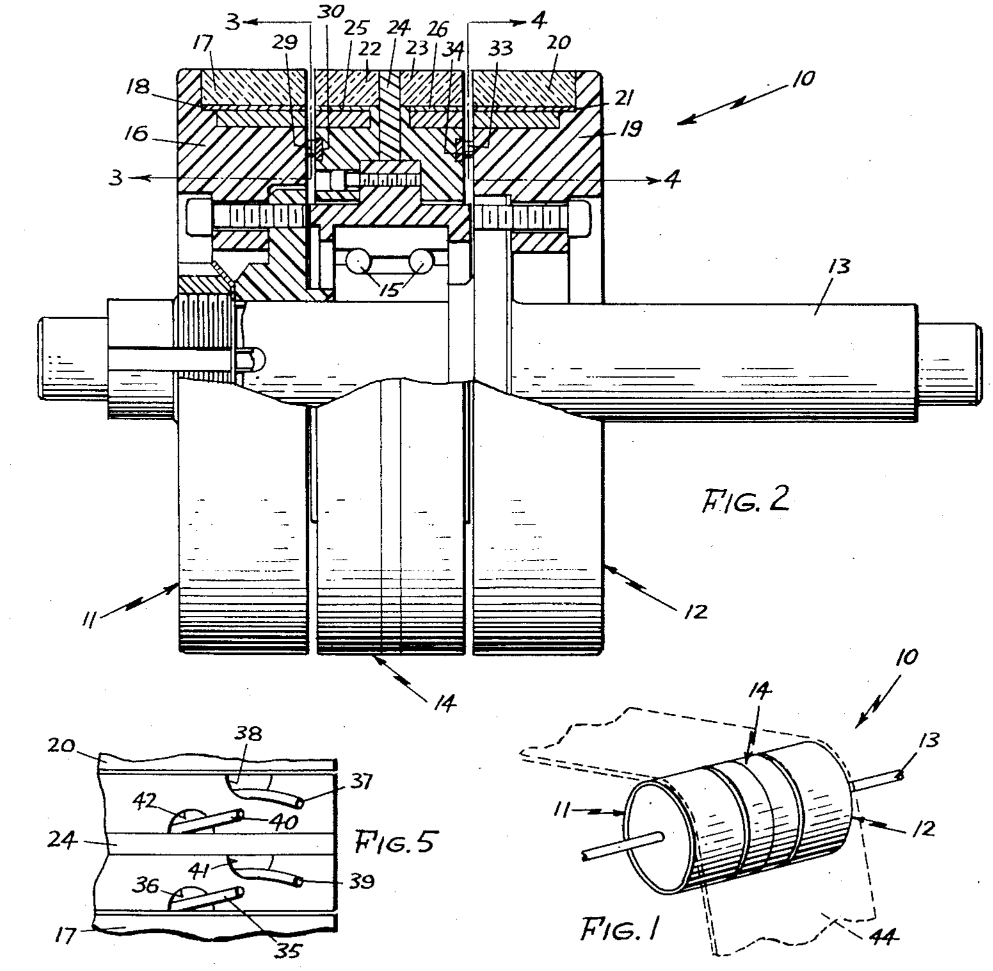
Fig. 1 is an illustration of a four-section capstan assembly.
Fig. 2 is a cross section of the four-section capstan assembly shown in simplified form in Fig. 1.
Fig. 5 is a part of the capstan assembly illustrated in Fig. 2.

Referring now to Figs. 1 and 2, there is shown a four-section capstan 10. Capstan 10 is called a split capstan, since both driving sections 11 and 12 are separate or split, and directly attached to shaft 13, whereas the stationary nonrotating section 14 is mounted on ball bearings 15 and is free to rotate about shaft 13. Suitable means (not shown) holds section 14 stationary, so that it will not rotate as shaft 13 rotates. Rotating section 11 is identical to rotating section 12 in that a nonconductive member 16, preferably constructed of a phenol composition, has embedded in its periphery a high K ceramic material 17, such as barium titanate, insulated from shaft 13 by phenol member 16. Conductive member 18 is bonded to dielectric member 17 in order to form a path for supplying the electrostatic force between dielectric member 17, and the conductive portion of the tape. It will be observed that dielectric member 17 does not fully cover the width of section 11, due to the effect of very high fields initiating corona discharges which burn the tape and create erratic tracking problems. By building up the size of driving member 11 with phenol material, as illustrated, the corona discharge problem has been reduced, if not eliminated. Rotating section 12 comprising phenol member 19, dielectric member 20, and conductive member 21 is constructed of the same material and in a similar manner as rotating member 11. Fixed member 14, which does not rotate as shaft 13 rotates, is constructed of two sections of dielectric material 22 and 23, preferably constructed of the same high K ceramic material as 17 and 20. A phenol section 24 is used to effectively insulate dielectric sections 22 from dielectric sections 23, which in effect results in a split, or two electrically nonrotating sections. A conductive member 25 is bonded to dielectric material 22, and a conductive member 26 is bonded to dielectric material 23 in a similar manner as conductive material 18 and 21 are bonded to dielectric members 17 and 20. Conductive member 25 is insulated from conductive member 26 by phenol section 24.

Figure 3:
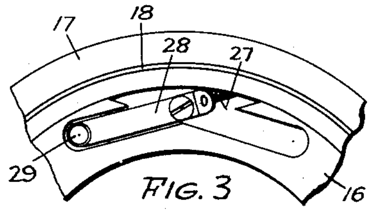
Fig. 3 is section 3—3 of Fig. 2.
Figure 4:
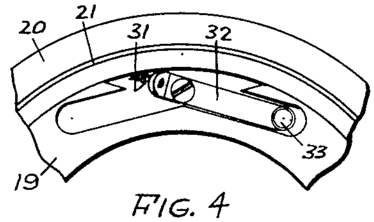
Fig. 4 is section 4—4 of Fig. 2.

In order to control the electrostatic clutch, it is necessary to have leads electrically connected to conductive members 18 and 21 of rotating sections 11 and 12, and conductive members 25 and 26 of stationary member 14. Fig. 3, which illustrates a view of rotating member 11, shows a wire 27 electrically connecting conductive member 18 with a brush assembly 28. Brush 29 is spring loaded and is caused to bear on ring 30, which is embedded on one side of fixed member 14, having the same radius as brush 29, thereby making continuous contact as rotating member 11 rotates. In a similar manner, Fig. 4 illustrates rotating section 12 and a wire 31 connecting conductive member 21 to a brush assembly 32, which, in turn, is connected to brush 33. Brush 33 is caused to bear on ring 34, which is embedded in fixed member 40 in a similar manner as ring 30.

Since stationary member 14 does not rotate, a lead 35 electrically connected to ring 30 is brought out through a semicircular opening 36 in fixed member 14, as shown in Fig. 5. In a similar manner, lead 37, which is electrically connected to ring 34, is brought out to a semicircular opening 38 in fixed member 14. A lead 39, which is electrically connected to conductive member 25, and a lead 40, which is electrically connected to conductive member 26 are brought out through semicircular openings 41 and 42 located in fixed member 14.

The key to the extremely short acceleration and deceleration time inherent in this system lies in the impressing of electrostatic forces between said tape and said capstan. For example, if motion of the tape is desired, a voltage signal is impressed to leads 35 and 37 which are connected to conductive members 18 and 21, respectively, of rotating members 11 and 12. A voltage applied between the end sections of the capstan will cause the magnetic tape and the rotating members of the capstan to become frictionally engaged with each other. As long as the tape and the rotating sections of the capstan are engaged, the tape will move in the direction of rotation of the capstan. In order to apply a braking action, a voltage signal is impressed across leads 39 and 40, which is electrically connected to conductive members 25 and 26 of stationary section 14, thereby causing electrostatic forces to be exerted between the tape and the stationary portion of the capstan. It will be noted, therefore, that control of the movement of the tape is accomplished by simply controlling a voltage, which can be readily done by electronic means.

Figure 6:
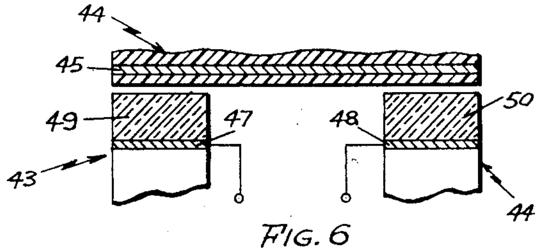
Fig. 6 is a cross section of a tape and driving capstan.

Referring now to Fig. 6, there is shown only the moving sections 43 and 44 of a capstan, illustrating the relative position of the moving parts of the capstan in relationship to a tape 44. A conductive coating 45, having a nonconductive coating 46 is bonded to that side of tape 44 closest to the rotating sections of 43 and 44 of the capstan. Fig. 6 illustrates how conductive members 47 and 48 of rotating sections 43 and 44 form the plates of a capacitor while inductive member 45 of the tape forms the second plate of the equivalent capacitor. Since the electrostatic forces are generated in the dielectric members 49 and 50, which are located between the plates of the capacitor, it can be seen that using a dielectric material having a dielectric constant of a thousand or more will permit the use of extremely high signal voltages to the plates of said capacitor, thereby achieving stronger electrostatic forces between the tape and the capstan.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. In combination, a first member and a second member each responsive to electrostatic forces, said first member comprising a conductive member bonded to a high K ceramic material having a dielectric constant of one-thousand or more, said second member comprising an elongated flexible tape, and means for frictionally engaging said first member and said second member with each other by electrostatic force.

2. In combination, a first member and a second member each responsive to electrostatic forces, said first member comprising a conductive member bonded to barium titanate whose dielectric constant is 1000 or more, said second member comprising an elongated flexible tape, and means for frictionally engaging said first member and said second member with each other by electrostatic force.

3. In combination, an electrostatically attractive tape, a capstan arranged to control the movement of said tape, said capstan comprising a conductive member bonded to a high K ceramic material having a dielectric constant of 1,000 or more, said tape including a conductive member bonded on one side, and means for frictionally engaging said capstan and said tape with each other by electrostatic force.

4. In combination, an electrostatically attractive tape, a capstan arranged to control the movement of said tape, said capstan comprising a conductive member bonded to barium titanate, said tape including a conductive member bonded on one side, and means for frictionally engaging said capstan and said tape to each other by electrostatic force.

5. In combination, a capstan and a tape each responsive to electrostatic forces, said capstan comprising a conductive member bonded to a ceramic material having a K of 1000 or more, and means for frictionally engaging said capstan and said tape with each other by electrostatic force.

6. In combination, an elongated electrostatically attractive tape, an electrostatic clutch for controlling the movement of said tape, said tape including an electrostatically attractive member, said clutch comprising a cylindrical movement controlling device over which said tape is adapted to pass on the peripheral surface thereof, said cylindrical member comprising a first metallic cylinder having a cylindrical ring of a ceramic material formed on the surface thereof, said ceramic material forming the peripheral surface of said cylindrical device and having a dielectric constant of at least one thousand.

7. The combination as defined in claim 6 wherein said ceramic material is barium titanate.

References Cited in the file of this patent

UNITED STATES PATENTS

| | | |
|---|---|---|
| 287,957 | Osborne | Nov. 6, 1883 |
| 1,155,727 | Harwood | Oct. 5, 1915 |
| 2,148,482 | Lorenz | Feb. 28, 1939 |
| 2,245,731 | Spreine | June 17, 1941 |
| 2,417,850 | Winslow | Mar. 25, 1947 |
| 2,576,882 | Koole et al. | Nov. 27, 1951 |